United States Patent
Reumerman et al.

(10) Patent No.: US 8,532,060 B2
(45) Date of Patent: Sep. 10, 2013

(54) DISTRIBUTED LEARNING METHOD FOR WIRELESS MESH NETWORKS

(75) Inventors: Hans-Juergen Reumerman, Eindhoven (NL); Francesc Dalmases, Les Franqueses del Valles (ES); Guido Roland Hiertz, Aachen (DE); Gustaf Sebastian Max, Cologne (DE)

(73) Assignee: Koninklijke Philips N.V., Eindhoven (NL)

( * ) Notice: Subject to any disclaimer, the term of this patent is extended or adjusted under 35 U.S.C. 154(b) by 711 days.

(21) Appl. No.: 12/159,915

(22) PCT Filed: May 12, 2006

(86) PCT No.: PCT/IB2006/051506
§ 371 (c)(1),
(2), (4) Date: Apr. 7, 2010

(87) PCT Pub. No.: WO2006/120652
PCT Pub. Date: Nov. 16, 2006

(65) Prior Publication Data
US 2012/0106362 A1    May 3, 2012

Related U.S. Application Data

(60) Provisional application No. 60/680,703, filed on May 12, 2005, provisional application No. 60/758,440, filed on Jan. 11, 2006.

(51) Int. Cl.
*H04W 4/00* (2009.01)
(52) U.S. Cl.
USPC .............................. 370/332; 370/255; 370/338
(58) Field of Classification Search
USPC .................. 370/255, 332, 338; 455/452.2
See application file for complete search history.

(56) References Cited

U.S. PATENT DOCUMENTS 5,949,760 A * 9/1999 Stevens et al. ............... 370/254
6,097,703 A * 8/2000 Larsen et al. ................. 370/254
(Continued)

FOREIGN PATENT DOCUMENTS

| JP | 2008510714 A | 4/2008 |
|---|---|---|
| WO | 02080397 A2 | 10/2002 |
| WO | 2006023629 A2 | 3/2006 |

OTHER PUBLICATIONS

Rene L. Cruz et al, "Optimal Link Scheduling and Power Control in CDMA Multihop Wireless Networks" IEEE Global Telecommunications Conference, vol. 1 of 3, Nov. 17, 2002, pp. 2-56.
Pierre Baldi et al, "Modeling and Optimization of UWB Communication Networks Through a Flexible Cost Function", IEEE Journal on Selected Areas in Communications, vol. 20, No. 9, Dec. 2002, pp. 1733-1744.

(Continued)

*Primary Examiner* — Huy D Vu
*Assistant Examiner* — Kuo T Chiang

(57) ABSTRACT

In a wireless mesh network, an algorithm is used by mesh points in the network to predict the success of and interference created by a new transmission opportunity. In particular, it is provided a method for mesh points, in a mesh network, to determine whether to transmit to another mesh point simultaneously while another transmission is taking place on the same communication link. A mesh point should not transmit to another mesh point if the mesh point's transmission interference disturbs a simultaneous transmission from another mesh point. Furthermore, a transmitting mesh point should not transmit to a receiving mesh point if the transmission will be disturbed at the receiving mesh point from interference from a simultaneous transmission from another mesh point.

21 Claims, 5 Drawing Sheets

(56) References Cited

U.S. PATENT DOCUMENTS

| | | | |
|---|---|---|---|
| 6,292,559 B1* | 9/2001 | Gaikwad et al. | 379/417 |
| 6,456,599 B1 | 9/2002 | Elliott | |
| 6,704,301 B2* | 3/2004 | Chari et al. | 370/351 |
| 6,798,765 B2 | 9/2004 | Larsson | |
| 6,967,944 B2 | 11/2005 | Choi | |
| 7,054,378 B2* | 5/2006 | Walton et al. | 375/267 |
| 7,519,371 B2* | 4/2009 | Nanda et al. | 455/452.2 |
| 2004/0151147 A1 | 8/2004 | Huckins | |
| 2005/0176401 A1 | 8/2005 | Nanda et al. | |
| 2007/0101015 A1* | 5/2007 | Larsson et al. | 709/238 |
| 2008/0260728 A1 | 10/2008 | Panzara | |

OTHER PUBLICATIONS

Guido R. Hiertz et al, "IEEE 802.11s—MAC Sublayer Functional Description, Mesh WLAN Security", Mesh Networks Alliance (MNA) Proposal, Jun. 2005, pp. 1-46.

R. Hekmat et al, "Interference in Wireless Multi-Hop Ad-Hoc Networks and Its Effect on Network Capacity" Wireless Networks, ACM, vol. 10, No. 4, Jul. 2004, pp. 389-399.

Steven Weber et al, "Transmission capacity of CDMA ad hoc networks employing seccessive interference cancellation" Global Telecommunications Conference, Nov. 29, 2004, pp. 2838-2842.

* cited by examiner

DISTRIBUTED LEARNING METHOD FOR WIRELESS MESH NETWORKS

MBOA (MultiBand OFDM Alliance) is a distributed system for WPAN (Wireless Personal Area Networks) running on an Ultrawide band (UWB) frequency band. Through DRP (Distributed Reservation Protocol), which makes channel resource reservations for future traffic, the MBOA system provides much higher channel access efficiency in a single hop communication scenario than other contention based protocols do, e.g., Prioritized Channel Access (PCA).

A mesh network is a PAN (Personal Area Network) that employs one of two connection arrangements, full mesh topology or partial mesh topology. In the full mesh topology, each node is connected directly to each of the others. In the partial mesh topology, some nodes are connected to all the others, but some of the nodes are connected only to those other nodes with which they exchange the most data. Mesh networks have the capability to provide a geographic extension of network coverage without increasing transmit power or receive sensitivity. Mesh networks also provide enhanced reliability via route redundancy, easier network configuration, and may increase device battery life due to the potential for fewer retransmissions of data.

Wireless mesh networks are multihop systems in which devices assist each other in transmitting packets through their network, especially in adverse conditions. One can establish a mesh network in a location with minimal preparation. Such mesh networks are also referred to as ad hoc networks. Mesh networks provide a reliable, flexible system that can be easily extended to thousands of devices.

The wireless mesh network topology, which was originally developed at MIT for industrial control and sensing, is a point-to-point-to-point, or peer-to-peer, system called an ad hoc, multihop network. A node such a network can send and receive messages. Furthermore, a node in a mesh network also may function as a router that can relay messages for its neighboring nodes. Through the relaying process, a packet of wireless data will find its way to its destination, passing through intermediate nodes with reliable communication links. In a wireless mesh network, multiple nodes cooperate to relay a message to its destination. The mesh topology enhances the overall reliability of the network, which is particularly important when operating in harsh industrial environments.

Referring to FIG. 1, through the relaying process, a packet of wireless data finds its way to its destination by passing through intermediate nodes with reliable communication links. In a wireless mesh network 10, multiple nodes, 12, 14, 16, cooperate to relay a message from an origin node 18 to its destination node 20. The mesh topology 10 enhances the overall reliability of the network, which is particularly important and useful when operating in harsh industrial environments.

Like the Internet and other peer-to-peer router-based networks, a mesh network 10 offers multiple redundant communications paths throughout the network. If one link between nodes fails (e.g. between node 14 and 16) for any reason (including the introduction of strong RF interference), the network automatically routes messages through alternate paths (e.g. from node 14 to node 22 and then to node 20).

In a mesh network, shortening the distance between nodes will dramatically increases the link quality. If the distance between nodes is reduced by a factor of two, the resulting signal is at least four times more powerful at the receiver. This makes links more reliable without having to increase transmitter power in individual nodes. In a mesh network, you can extend the reach, add redundancy, and improve the general reliability of the network simply by adding more nodes to the network.

Ultra wideband (UWB) is a wireless technology for transmitting large amounts of digital data over a wide spectrum of frequency bands with very low power for a short distance. Ultra wideband radio can carry a huge amount of data over a distance up to 230 feet at very low power (less than 0.5 milliwatts) and has the ability to carry signals through doors and other obstacles that tend to reflect signals at more limited bandwidths operating at a higher power. Ultra wideband is comparable with another short-distance wireless technology, such as Bluetooth, which is a standard for connecting handheld wireless devices with other similar devices and/or to, for example, desktop computers.

Ultra wideband broadcasts digital pulses, which are timed very precisely, on a carrier signal across a very wide spectrum (on a plurality of frequency channels) at the same time. The wideband transmitter and receiver must be coordinated to send and receive pulses with a high accuracy of within trillionths of a second. On any given frequency band used in an ultra wideband system, an ultra wideband signal requires less power than a normal signal on the band. Furthermore, the anticipated background noise of an ultra wideband signal is so low that theoretically no interference is possible.

Ultra wideband is being used in various situations, to date two prevalent applications of UWB include applications involving radar, in which the signal penetrates nearby surfaces, but reflects surfaces that are farther away, allowing objects to be detected behind walls or other coverings, and voice and data transmission using digital pulses, allowing a very low powered and relatively low cost signal to carry information at very high rates within a restricted range.

Embodiments of the present invention provide a method for mesh points, in a mesh network, to determine whether to transmit to another mesh point simultaneously while another transmission is taking place on the same communication link. A mesh point should not transmit to another mesh point if the mesh point's transmission interference disturbs a simultaneous transmission from another mesh point. Furthermore, a transmitting mesh point should not transmit to a receiving mesh point if the transmission will be disturbed at the receiving mesh point from interference from a simultaneous transmission from another mesh point.

An embodiment of the invention can be a wireless network that comprises a plurality of mesh points that are participating in the wireless network. Each one of the plurality of mesh points calculates a first ratio that estimates a probability of a successful transmission, between itself and at least another one of said plurality of mesh points, without disturbing a simultaneous transmission in the wireless network with interference from the successful transmission.

In another embodiment of the invention, a wireless network includes a plurality of mesh points and a method is used to determine whether a first mesh point can transmit to a second mesh point while another mesh point is transmitting on the same link simultaneously. The method includes detecting, by the first mesh point, other mesh points in the wireless network and determining, at the first mesh point, the signal strengths of the detected other mesh points in the wireless network. The method estimates, at the first mesh point, a signal strength that would be measured at the second mesh point if the first mesh point is transmitting. The first mesh point then calculates a first carrier over interference (CoI) ratio. The method continues by determining whether the first mesh point should transmit to the second mesh point based on comparing said first CoI to a threshold value.

Embodiments of the invention can be used in multi-hop networks. Furthermore, embodiments of the invention may be used in conjunction with IEEE802.11 standards and MAC protocols including, but not limited to, being in compliance with the future IEEE802.11s (ESS MESH) standards. Embodiments of the invention may also be applied successfully to other wireless standards and technologies to support mesh networking (i.e. WPANs). Embodiments of the invention take advantage of mesh network topology to support simultaneous transmissions occurring on the same communication link or channel.

It is understood that the above summary of the invention is not intended to represent each embodiment or every aspect of the present invention.

A more complete understanding of the method and apparatus of the present invention may be obtained by reference to the following Detailed Description when taken in conjunction with the accompanying Drawings wherein.

Figure 4:
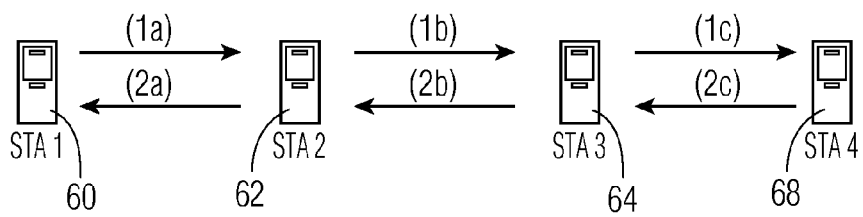
FIG. 4 is a sample of a simple wireless mesh network wherein spatial reuse is possible.
Figure 7A:
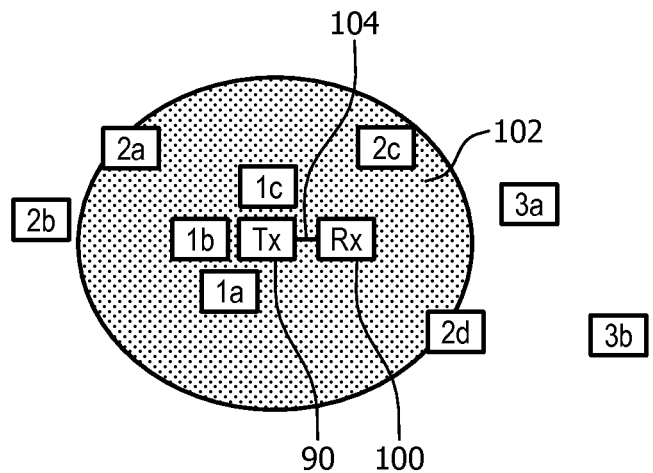
Figure 8:
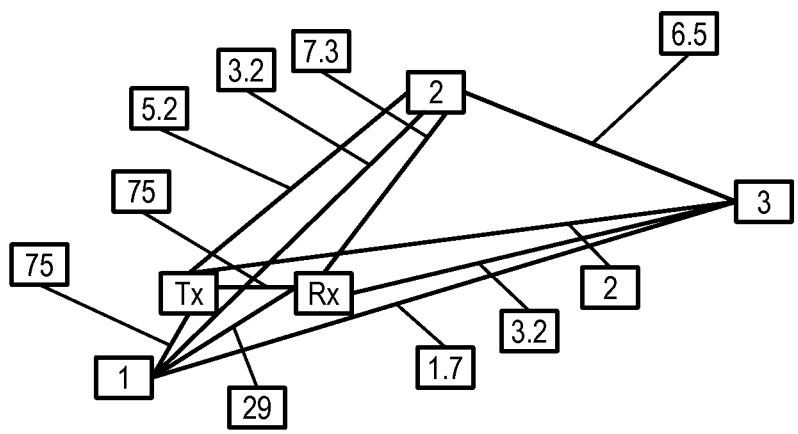
Figure 9:
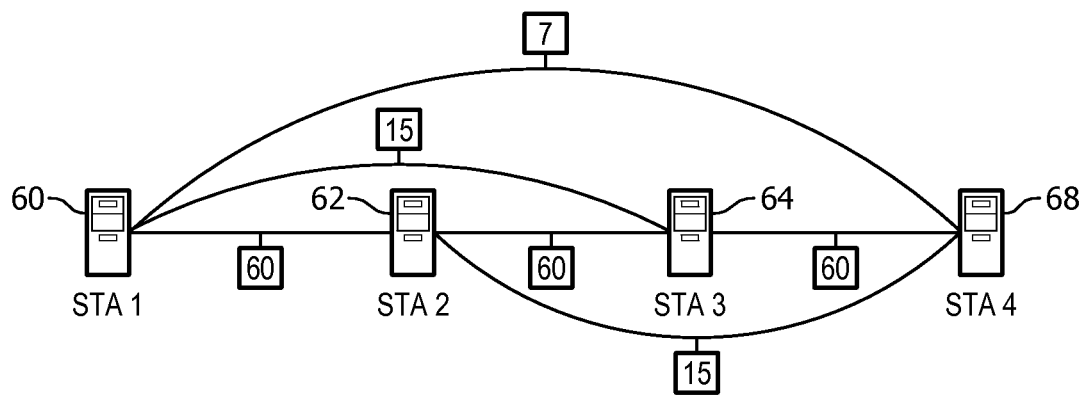
Figure 10:
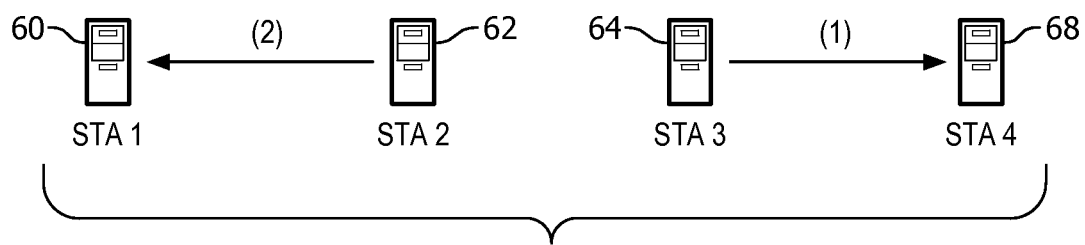

FIGS. 7(a) and (b) is a diagram of measures of signal strength when (a) a mesh point TX is transmitting, and (b) when mesh point RX is receiving;

FIG. 8 is an exemplary signal strength graph for a scenario having stations Tx, Rx, 1, 2, and 3;

FIG. 9 is an exemplary signal strength graph for the scenario of FIG. 4; and FIG. 10 is a diagram that helps explain the situation of mesh point 2 learning the signal strength of link (1).

Existing Medium Access protocols for Wireless LAN like IEEE 802.11 do not efficiently support multihop communication. Therefore, there is a need to find and to define procedures that allow for building an Extended Service Set (ESS) as a collection of Access Points (APs) interconnected with wireless links that enable automatic topology learning and dynamic path configuration. An ESS Mesh is functionally equivalent to a wired ESS, with respect to the stations' relationship with the Basic Service Set (BSS) and ESS.

Embodiments of the invention provide a Medium Access Control (MAC) protocol for a Wireless Distribution System (WDS) between a set of 802.11 access points (APs). Mobile stations operating in accordance with various embodiments and associated to any of the access points shall be able to communicate with: 1) Any access point in the given set; 2) Any mobile station associated to an access point in the set, and 3) Any connected external networks via a Mesh gateway.

The communication between the access points enabling the mentioned points shall be transparent to the mobile stations in embodiments of the invention, especially with respect to the station's location.

Access points in this exemplary wireless distribution service play a twofold role: On the one hand, the access points act as a basic 802.11 access point, providing special features to their associated stations. On the other hand, the access points are wireless stations themselves, communicating with each other to fulfill the services they have provided to their basic service set (BSS).

Figure 1:
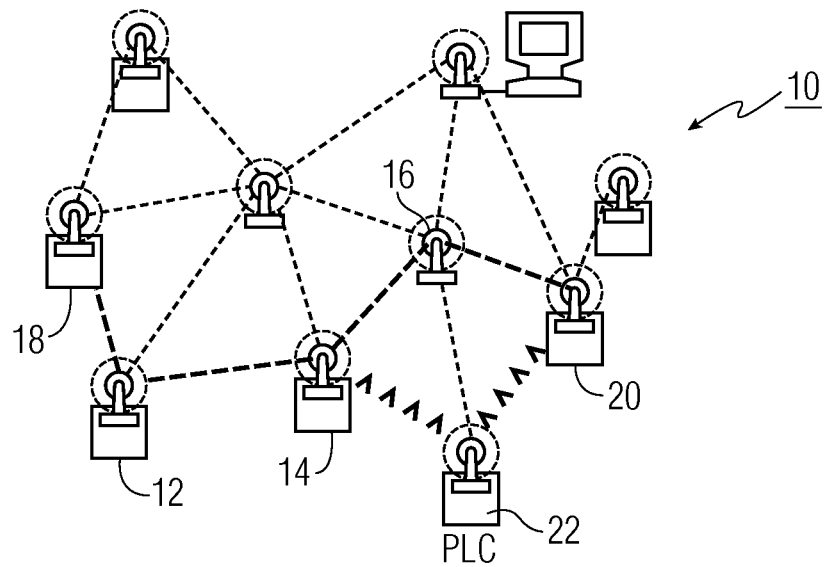
FIG. 1 is a general diagram of a mesh network.
Figure 2:
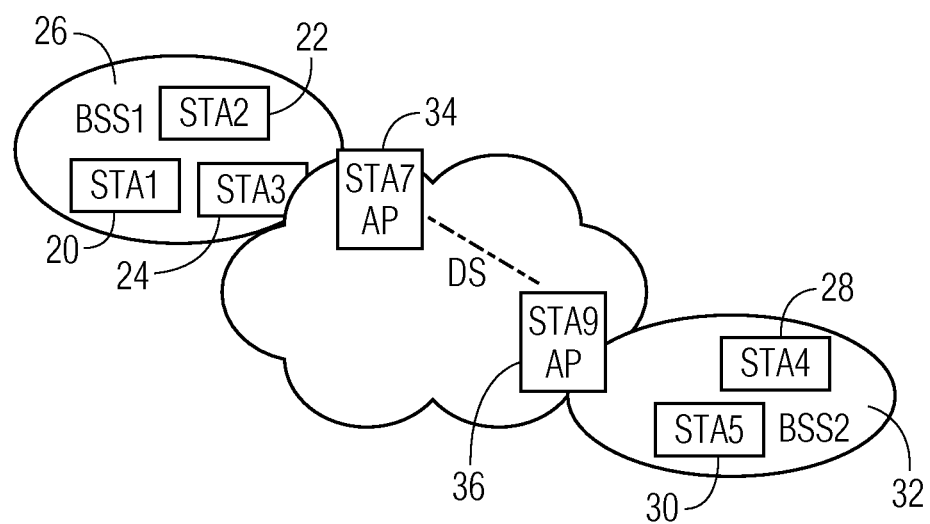
FIG. 2 is a diagram of an exemplary wireless scenario.

A typical scenario of an exemplary wireless scenario with two BSSs and one Distribution System (DS) is depicted in FIG. 2.

Stations one 20, two 22, and three 24 in BSS1 26 and stations four 28 and five 30 in BSS 32 constitute two, non-overlapping BSSs. The access point (AP) 34 in BSS1 26 and the access point 36 in BSS2 32 enable inter-BSS communication. The MAC-mechanism that supports this communication in a wireless distribution system (WDS) will be discussed below.

The following assumptions may be made regarding the possible scenarios in accordance with embodiments of the invention:

1) Ad-Hoc placement of access points:

The spatial position of the access points is unknown to themselves and to the other access points; an access point may be placed arbitrarily in a given area. There is no previous knowledge regarding the structure of the environment, the distances between neighboring APs, and the interference situation; and furthermore there is no possibility to obtain geographical information about the APs or obstacles between them.

2) The access point topology is semi-stationary to stationary:

The speeds of any AP changes are negligible compared to the movements of associated stations and the traffic patterns.

3) The network of access points is not fully connected:

Due to indoor—conditions or large areas to be served, it cannot be assumed that the communication graph of the APs, describing the possibility of direct communication between APs, is fully connected. However, each pair of APs must be connected by a path of possibly several other APs, which means that the communication graph is connected.

One implication of this assumption is the impossibility of a simple broadcast in the DS, which complicates any attempt of a centralized coordination. Another one is the need of multi-hop-mechanism, allowing APs to relay data from one AP to other APs and so on so that the data can continue on its way to a final destination.

Figure 3:
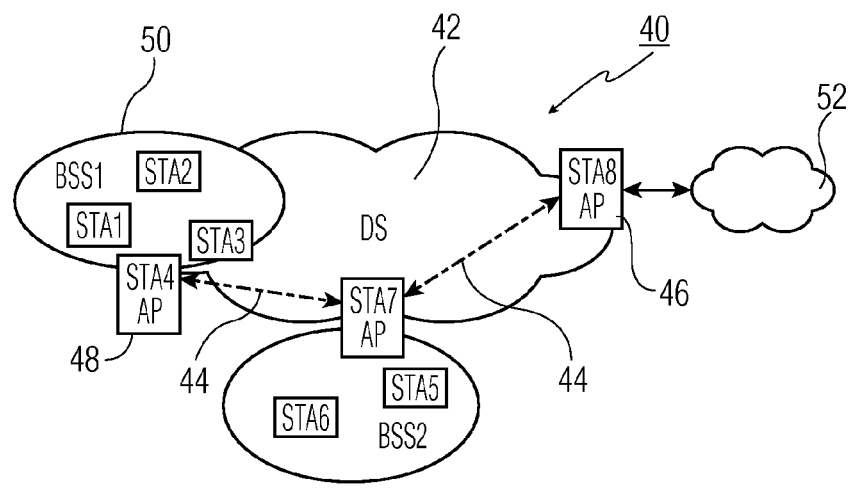
FIG. 3 is a diagram of an exemplary wireless multihop scenario.

An example scenario where multihop communication is needed can be seen in FIG. 3, which is another wireless multihop scenario 40. By transparent usage of the DS 42 and a multihop connection 44 between the AP 46 and AP 48, the stations in BSS1 50 are able to connect to Station 8 46, which acts as a gateway to the internet 52. Without a multihop-enabled DS 42, this would be impossible because Station 4 48 cannot wirelessly reach and communicate with Station 8 46.

Exemplary access points may posses only a single frequency radio. This requirement simplifies and decreases the cost of the construction of APs, but causes the complication that the DS and every BSS have to share the same wireless medium, resulting in possible conflicts and efficiency decreases. An exemplary improvement of the MAC-protocol can be archived using dual-frequency radios or even multi-frequency radios.

In embodiments of the invention discussed below, it should be understood that, a station is (1) a basic 802.11-access point, able to provide management services like association and creation of a BSS, and (2) is a station in a wireless distribution system, able to use multi-hop communication between its peers to obtain abilities needed for its access-point functions, and (3) is placed in a scenario as explained above that is defined to be a mesh-network station or mesh point.

In contrast to the EDCA, which is used in an AP traffic phase, an exemplary MAC protocol allows an efficient multihop communication in the mesh network. The use of negotiated transmission opportunities (TxOPs) of equal length result in a predictable medium access, as all neighboring mesh points are able to learn which mesh point in the mesh network plays what part during a TxOP. This enhanced knowledge/information provided to the mesh points allows the protocol to allow for greater spatial reuse, which directly is followed by a capacity increase of an exemplary mesh network.

A simple example for the possibilities of spatial reuse can be found in FIG. 4. Mesh points STA1 60, STA2 62, STA3 64, and STA4 68 each have their own BSS and probably several associated mobile stations. The mobile stations in the BSS of mesh point STA1 60 generate traffic that is addressed to mesh point STA4 68 (STA4 68 is, for example, a gateway or portal to the internet), and mesh point STA4 68 replies to traffic.

As mesh point STA1 60 and STA4 68 are mutually out of reception range, they cannot communicate directly with each other. They must use two, three hop routes via mesh points STA2 62 and STA3 64, which are depicted as (1a-c) and (2a-c).

If mesh point STA3 64 is able to guess that simultaneous usage of link (1a) and (2c) is possible because the interference created by mesh point STA1 60 at mesh point STA3 64 during the transmission is low, then mesh point STA3 64 may negotiate with mesh point STA4 68 such that the number of used TxOP are to be the same as they are used for the link (1a). The latter information is directly available to mesh point STA3 64 via the negotiation procedure between mesh point STA1 60 and mesh point STA2 62.

Figure 5:
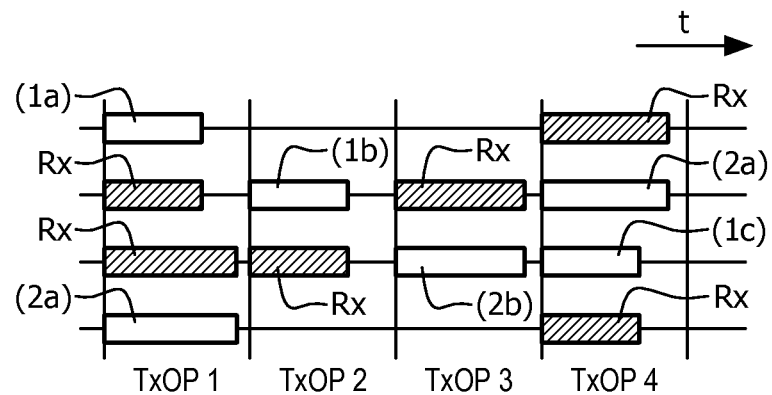
FIG. 5 is a chart of an optimal alignment of transmissions over time for the network of FIG. 4.

Similarly, links (1c) and (2a) can be used simultaneously, which results in an exemplary traffic/time diagram as given in FIG. 5. FIG. 5 is an optimal alignment of the transmissions during time for the scenario in FIG. 4.

The above scenario is an example of optimal behavior by the mesh points as seen from an external observer's perspective, but it is not obvious how the mesh points operate to exhibit this behavior.

Already existing MAC protocols, like EDCA, do not support parallel transmissions. In a related patent application, Ser. No. 13/346,262, titled, "Distributed Medium Access Protocol for Wireless Mesh Networks", which is incorporated herein by reference, a new MAC protocol that allows an efficient multihop communication in the mesh network is taught. Therein, it is taught that the use of negotiated ownerships of equal length TxOPs result in a predictable medium access, as all neighboring mesh points are able to learn which mesh point plays what part during a TxOP. This enhanced knowledge allows the new MAC protocol to provide greater spatial reuse, which directly leads to a capacity increase of the mesh network.

Embodiments of the present invention further enhance the efficiency of multihop communication is a mesh network by providing, among other things, a method that allows Mesh points to learn to estimate the environment and to decide whether simultaneous transmissions are possible in the estimated environment. The possible internal mechanisms of the mesh points are explained in the next sections.

One feature of embodiments of the present invention is a definition of a new learning and distributed algorithm that is used by the various mesh points for predicting if a new transmission opportunity (TxOP) or transmission slot can be used for a transmission.

The exemplary distributed algorithm, first, detects the devices participating in the network by receiving information from beacons and/or other mesh point's traffic headers or other mesh point's beacons. Then, the exemplary distributed algorithm measures and stores the received signal strength for every node in its network. Next, the distributed algorithm estimates the quality of the links in the mesh point's environment based on each of the link's Carrier over Interference (CoI) ratios. With this CoI information, the mesh point then can calculate a graph or table representing the different existing links use the graph or table to decide whether a simultaneous new transmission can take place in the existing environment.

Learning Mesh Points

Before mesh points can take advantage of simultaneous transmission, each mesh point must learn to model its current environment. A model of a mesh point's current environment is called a world model. This world model should be as simple as possible, abstracting from reality as much as possible. Also, the world model should be as detailed as necessary in order to provide good estimations of various options available for a specified transmission. The world model is updated continuously by sensors of its mesh point. The sensors of the mesh point are the receiving entities of the physical layer together with information about the TxOP ownerships, received beacons, information elements, and heard transmissions.

From time to time, a request for a new TxOP ownership or a request for change of an existing TxOP ownership arises in a mesh point. For example, a new TxOP ownership request or a request to change an existing TxOP ownership may occur because a new traffic stream is started by an associated mesh point or because a TxOP ownership negotiation request is received by a neighboring mesh point. These requests would be processed using the world model to find free TxOPs that suit the current status regarding the intended role (transmitter or receiver) and the priority of the traffic.

After a request is processed using the world model, the resulting information is used to so that the TxOP negotiation process selects a suitable set of TxOPs and starts the negotiation process (or answers the request respectively), probably preferring TxOPs that lead to a simultaneous transmission.

Figure 6:
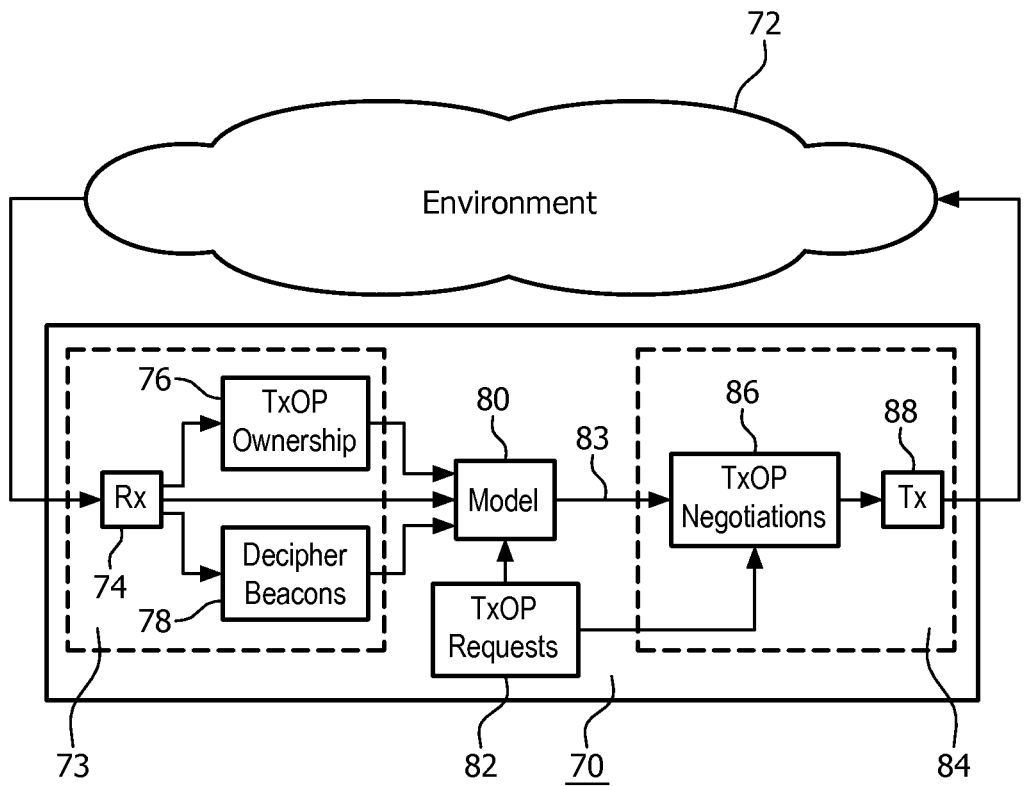
FIG. 6 is a general structure of an exemplary interference-aware mesh point.

The abstracted structure of a station 70 that is able to adapt to the interference occurring in a network can be seen in FIG. 6. FIG. 6 is the general structure of an interference-aware mesh point 70. The exemplary interference-aware mesh point or station 70 is located in an environment of a plurality of mesh points and/or stations 72. Transmissions from the environment 72 are received by a station's sensors 73. A receiver 74 is part of the station's sensors and receives transmissions. The station determines TxOP ownerships 76 and deciphers received beacons 78. The received information from the sensors 73 is processed such that the world model 80 can be created. Requests for new or changed TxOP requests 82 are also provide to the world model 80 so that it can be continuously updated. The world model 80 provides available or usable TxOPs for requests to the actuators 84. TxOP negotiation 86 is performed using information from the world model 80 and other information related to requests for new or changed TxOP ownership. The transmitter 88 transmits the results of the station's 70 TxOP negotiations out to the network environment 72.

Measuring the Learning Performance

Before describing how the entities (mesh points, stations, etc) in a network perform the learning process of how each entity understands its environment in order to create a world model, let's first define what good behavior of a mesh point is, and what type of actions should be avoided by a mesh point.

Embodiments of the invention are mainly concerned with the ability of stations to perform simultaneous transmissions. Other criteria that involve an optimal selection of TxOPs under fairness conditions or QoS requirements like throughput and delay are not discussed. Therefore, the exemplary algorithm, which chooses and negotiates the TxOPs, is handled as a black box that gets a set of TxOPs that could be suitable for a specified transmission to/from a mesh point, optionally combined with a rating of each TxOP. As a result, the performance of the learning algorithm can be measured by the number of "good" TxOPs it proposes to this black box, compared to the number of "bad" TxOPs.

To define the terms "good" and "bad" TxOP more precisely, FIGS. 7(a) and (b) are helpful. The FIGS. 7(a) and (b) depict measures of signal strength when (a) Tx 90 is transmitting and (b) when Rx 100 is receiving.

Figure 7B:
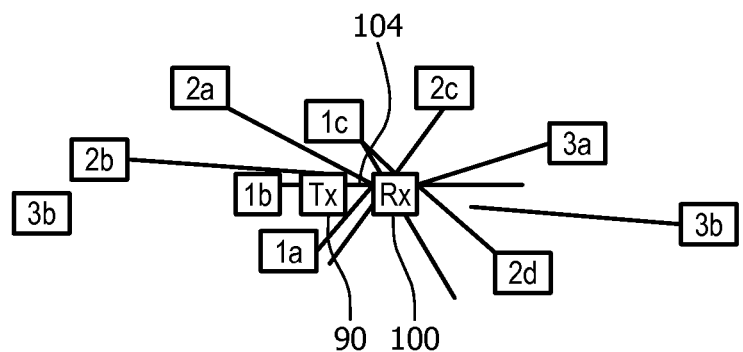

Both subfigures (a) and (b) show an example environment with 11 mesh points, two of them are marked as the transmitting 90 and the receiving 100 mesh point respectively. In FIG. 7(a), the transmission power 102 of the transmitting mesh point 90 is drawn in shaded gray color. The transmission power's 102 strength is proportional to the distance to the mesh point. FIG. 7(b) shows the transmission power (in the form of shaded gray line) of all the other stations in the environment as seen from the Rx mesh point 100. In both cases, a line 104 indicates the traffic from the Tx 90 to the Rx 100 mesh point.

The decision if a TxOP is "good" must be made based on the desired role of the mesh point: If a mesh point wants to transmit, a TxOP is "good" if it does not disturb a simultaneous transmission by its interference. With the power 102 as indicated in FIG. 7(a), the transmitting mesh point 90 would certainly adversely interfere with or disturb any transmission that is being received at the mesh points "1a-1c". The impact on reception at mesh points "2a-2d" would be much lower. Furthermore, a transmission from mesh point "2b" to "2a" should not be a problem; whereas a transmission between mesh points "3a-3b" would not sense anything from a Tx 90 transmission 102. Additionally, the effect of the transmission depends not only on the distance to another mesh point, but also on the position of the simultaneous transmission's sender: It is less interfering if the distance from the simultaneous sender to the transmitter 90 is very small.

The second circumstance, as indicated in FIG. 7(b), occurs when the Mesh point wants to receive 100. A TxOP is now called "good" if at the same time a simultaneous transmission creates only a low or non-disturbing interference at the receiver. This is, for example, the situation if mesh points "2a-2b" or "3a-3b" are sending.

In the depicted environment of FIGS. 7(a) and (b) some simplifications are made. The shape of the signal strength 102 may be more complicated than a circle around the transmitting mesh point 90. Furthermore, the shape may not be constant over time. It is understood that moving obstacles and/or different channel conditions can change the effects of a transmission.

The World Model

The task of the world model 80 inside the learning mesh point 70 is to represent the surrounding environment in the simplest way that allows a good prediction of whether a given TxOP is "good" or not. The detailed implementation of the world model, which also includes how the outputs of the sensors are used to update its state, is of course independent of the communication protocol specifications, and can be optimized to fulfill different aims. For example a trade off between the needed complexity, the used computational effort and the accuracy of the predictions must be made.

The world model 80 is limited by the sensitivity and accuracy of the given sensors 73. An optimal model, in the case discussed here, would know the position of all mesh points in its network, as well as the link characteristics between the mesh points, along with the placement of any obstacles. Of course, such an optimal model situation is not possible in the real world, because some of the needed information can only be obtained by utilizing and enormous amount of overhead traffic (for the mutual link characteristics) or is not achievable under any circumstances (i.e., like knowing the placement of any obstacles).

The following world model is therefore only an example. The following world model relies on the MAC protocol utilized and some information that can be obtained as a side product of the utilized MAC Protocol.

An exemplary world model is derived from the fact that in wireless networks the success probability of a transmission is mainly determined by the ratio of the useful signal strength at the receiver versus the strength of the interfering signals. In other words, two possible reasons for interference due to background noise and simultaneous transmissions. Therefore, this ratio, called the Carrier over Interference (CoI), is measured as $$CoI = \frac{C}{N + \Sigma I}$$

C is the carrier's signal strength, N is the current noise and the sum stands for the interference that is produced by other transmissions. Usually $\Sigma I \gg N$, if a simultaneous transmission is existent; therefore, the noise can be neglected in the non trivial cases.

It is important to notice that two different CoI ratios, the receiver CoI and the interference CoI, should be taken into account before a new, simultaneous transmission is started:

1. The receiver CoI

This CoI reflects the success probability that the receiver of a simultaneous transmission is able to decode the signal in spite of the primary transmission.

2. The interference CoI

By introducing a new simultaneous transmission, the transmitter creates a new source of interference for the primary transmission. Therefore, both mesh points of the new link have to avoid that this new interference is severe at the original receiver.

In embodiments of the invention, the current status of the world model may be represented by a signal strength graph, chart, data table or other applicable means. A signal strength graph could be a complete graph G=(V, E) together with a weight function w: E−>N that connects an integer to every edge of the graph. Any mesh point that is recognized by a sensor (like an Rx entity or a beacon protocol) is represented as a node in the graph. The weight of an edge between two nodes (X, Y) is an estimation of the signal strength as measured at node Y if node X is sending/transmitting data. As the links between nodes are, by assumption, bidirectional w (X, Y)=w (Y, X) and the graph can be undirected.

FIG. 8 provides an exemplary graph for the five mesh points Tx, Rx, 1, 2 and 3. The signal strength is abstracted as a weight of the connecting edge. Thus, FIG. 8 is a signal strength graph for a scenario with stations Tx, Rx, and 1 to 3. Having a well created world model for each mesh point will nicely approximate the current state of the environment. Then, mesh points possessing this graph (i.e. FIG. 8) can compute an estimation of the interference CoI during a simultaneous transmission from Tx to Rx. Furthermore, the world model can support the computation of the receiver CoI at Rx.

The interference CoI is estimated by dividing the weight of the link that represents the simultaneous transmission by the interference that is produced by Tx (given by w (Tx, [receiver of the simultaneous transmission]). The higher the quotient of those two weights, the lower is the chance that Tx interferes with the transmission.

Similarly the receiver computes a value of CoI as the quotient of w (Tx, Rx) and the interference of the simultaneous transmission, which is represented by w (Rx, Sender of the simultaneous transmission). A high indicator would here also express a high chance of a successful reception.

Of course the exemplary method can be easily extended to multiple simultaneous transmissions or to multiple receiver transmissions.

An exemplary algorithm can compute the CoI for every possible simultaneous transmission and then rate all the TxOPs given the information about the current ownerships using the ownership protocol as a sensor. The exemplary graph (or data derived there from) provides an outcome that is a list of "good" TxOPs, which are likely to provide a high success of reception and a low interference ratio to other parallel transmissions. Furthermore, a threshold may be given that determines whether the computed CoI ratio is high enough. Alternatively, a decision on whether the CoI is appropriate for parallel transmissions can be made based upon a (learnable) soft threshold function like the sigmoid function $$\left(\frac{1}{1+e^{-x}} + \text{Offset}\right).$$

The computed CoI indicators for the transmission Tx to Rx in the given example graph can be seen in Table 1, all impossible pairs of transmissions (like Tx->Rx and Rx->2 in the same time) are omitted.

TABLE 1

Interference CoI and Receiver CoI if a simultaneous transmission from Tx to Rx occurs.

| Transmissions in TxOP | Receiver CoI [dB] | Interference CoI [dB] |
| --- | --- | --- |
| None | 0 | maximum |
| 1 -> 2 | 4 | −2 |
| 2 -> 1 | 10 | −14 |
| 1 -> 3 | 4 | −1 |
| 3 -> 1 | 13 | −16 |
| 2 -> 3 | 10 | 5 |
| 3 -> 2 | 13 | 1 |

Table 1 clearly shows that the transmission Tx->Rx cannot be scheduled simultaneously to most of the other possible transmissions, perhaps only parallel to the transmission 2->3. A different case can be seen if the graph of the introduction example (FIG. 4) is examined, which is given in FIG. 9, which is the signal strength graph for the scenario given in FIG. 4.

If the transmission from mesh point 4 68 to mesh point 3 64 is scheduled in a TxOP, the interference indicator for 1->2 is 10*Log(60/15)=6 dB, and the reception indicator for 1->2 is also 6 dB, which may be rated as a "possible" TxOP if a slow PHY mode is used.

Before any exemplary methods of establishing the graph and the associated weights are presented, it should be understood that the abstraction done in the world model can be easily utilized with varying types of transmission technologies such as directed/directional antennas or MIMO devices: If they improve the receiver CoI ratio and/or lower the interference CoI, their performance is directly incorporated into the model.

Similar, the effects of obstacles like walls indirectly influence the graph and therefore may also be incorporated.

Continuous learning of the graph can be divided into two separate tasks: First, the graph's structure (V, E) must be learned. The graph's structure (V, E) is the identification of the network's participants. Second, the weights in the graph are learned. The first two tasks are carried out continuously while the station is operating. The two tasks may be carried out at a speed that is adaptable to the environment, thereby allowing the model to become a good approximation of the environment and also being able to react to changes. The learning process is made difficult by any insufficient and unreliable output of the three sensors 74, 76, 78 that are used because as they have not been specifically designed to fulfill the exemplary task. Thus, filtering of the sensor's output is one of the most important subtasks of the exemplary learning process.

Another and perhaps last requirement of the learning process is that the learning process should recognize situations where its knowledge is insufficient to result in good estimations for the two CoI values. In detail, a result of the learning process should be ignored if the interference CoI is overestimated and thus disturbs an existing transmission.

Learning the Network's Participants

Recognizing other mesh points in the network 72 can be done easily using the exemplary beacon period access protocol and by receiving other mesh point's traffic headers. From the beacon protocol, a mesh point can identify the beacon's sender, the sender's neighbors and the neighbor's neighbors, because each of them is announced in the owner vector of the BPOIE.

In the traffic during the MIT, each traffic train has an initial header which gives the structure of the following wagons, including the recipient of each wagon. Using this information, a mesh point can detect other mesh points by listening to the headers even if in the TxOP it is not a receiver.

Each occurrence of a mesh point's DEVID (either in the BP or during the MTP) can be seen as a "ping" indicating the mesh point as being "alive". It is recommended that a mesh point is included in the graph the first time a "ping" is heard from it. And, should be deleted from the graph with a probability that increases with the amount of time that passes with no "ping" being heard.

Learning the Signal Strength

For every new mesh point that is recognized, the weighting or prioritizing of signals from the other mesh points must be estimated. This can be done in several ways. Each sensor gives some hints toward how the signal weights should be set, sadly the sensor's outputs are often noisy and have to be filtered or weighted before they can be taken into account.

For example first, if a current graph consists of N mesh points, (N+1)*N/2 weights have to be estimated. Of those links, (N−1) are directly connected to the learning mesh point. The directly connected links can be learned faster and with more confidence. It is noteworthy that in an exemplary interference and in the receiver CoI, three out of four signals that needed weighting were direct links of either the transmitter or the receiver; only one weighted signal in the interference CoI was within a one hop distance, as the weighting described the signal strength of the primary transmission measured at the primary receiver. To avoid overestimating the interference CoI, the lower bound of this weighting function is crucial.

Second, learning the (N−1) direct links can be done by using the timing information in the beacon access period protocol together with some side information by the PHY layer. By using the Beacon Period (BP), a mesh point senses the point in time when a neighboring mesh point is transmitting its beacon. Furthermore, because of the strict rules in the BP, the mesh point will sense that no other near mesh point is transmitting during BP time.

For each beacon slot in the BP, the PHY layer can measure the integrated signal strength, and then report this strength to the MAC layer. The MAC layer then combines this information with the BP access protocol to determine an estimation of the signal strength of a particular neighbor.

The weight on each link can now be computed using this estimation method. The easiest solution would be to simply take the most current estimation and neglect older values. Another, perhaps more intelligent solution could be to perform a low pass filtering of the estimates in order to obtain a running exponential weighted average. If the newest measurement, obtained in the beacon period number t, is denoted as, the running estimation is computed as:

$$\hat{e}_t = \alpha \cdot e_t (1-\alpha) \cdot \hat{e}_{t-1}$$

with α as a parameter weighting the importance of new measurements versus the old knowledge. This solution would of course solve the problem of short noisy measurements, although it increases the computational complexity.

Finally, a third exemplary possibility for learning the links is to use a one dimensional Kalman filter to obtain an incremental estimation using the measurements. A Kalman filter assumes an additive white Gaussian noise with an unknown variance as an error on the PHY measurements; it can compute the current expected "real" signal strength together with the variance that it assumes together with this estimation. An advantage of the Kalman filter is that it weights the influence of new measures proportional to the current degree of believe of the estimation. Therefore, it can be seen as an enhancement of the exponential weighted average. In the latter case, all measurements are weighted with the same α; In contrast, the Kalman filter is able to adapt this coefficient to the current variance.

The increased computational complexity in comparison to the exponential weighted average is an obvious downside of the Kalman filter.

By using one of the described mechanisms, the learning mesh point is able to learn or establish a weight for all direct links whereas all other links remain unknown. As it was explained above, an estimation of the lower bound of the weight of the other links suffices for a good interference CoI computation; therefore, two different methods having different complexities can be used.

The first method is explained by the use of FIG. 10. In FIG. 10, the mesh point "2" 62 wants to learn the signal strength of route (1). In this very simple scenario, mesh point "2" 62 wants to initialize a transmission that is simultaneous with the transmission (1) from mesh point "3" 64 to mesh point "4" 68. Therefore, mesh point "3" 64 has to compute the interference CoI, which needs a lower bound of the signal strength that is detected at mesh point "4" if mesh point "3" is transmitting.

Here, the medium access protocol (MAC) during the mesh traffic phase can be used as a simple sensor to get information about this signal strength. When frame aggregation is used in the train header then the PHY mode is indicated for each receiver. Since a train header is send in a basic PHY mode, the chances are high that mesh point "2" 62 will receive and read this header and therefore determine the PHY mode that is used. Since a PHY mode can only be received and read successfully if the signal strength at the receiver is above a minimum threshold, mesh point "2" 62 can conclude the minimum signal strength, which suffices for the CoI. Table 2 shows the minimum signal strength in dBm for the different 802.11 PHY modes.

TABLE 2

The minimum signal strength for the successful reception, depending on the PHY-mode

| PHY mode | Minimum C (dBm) |
| --- | --- |
| BPSK ½ | −82 |
| BPSK ¾ | −81 |
| QPSK ½ | −79 |
| QPSK ¾ | −77 |
| 16QAM ½ | −74 |
| 16QAM ¾ | −70 |
| 16WAM ⅔ | −66 |
| 64QAM ¾ | −65 |

The other possible exemplary method appears to result in additional overhead because it uses special IEs to disseminate the information about the received signal strengths over the network. This signal strength IE consists only of three fields: The mesh point where the signal is received, the transmitting mesh point and finally a decibel value expressing a lower bound on the signal strength.

The lower bound may be obtained by the estimation of direct links as discussed above, especially if a Kalman filter was used, together with the variance, a confidence interval, which can be computed for the estimation thereby providing the information needed to disseminate the lower limit of an interval.

The frequency of sending of SSIEs should be very low. Additionally, it is possible to adapt the SSIE to the behavior of the link, e.g. information about a steady, only slightly changing link is disseminated less often than information about a fluctuating link. Furthermore, information about a link should not be send at all if the current knowledge is not very profound.

The integrity of data about direct links in a received SSIE can be trusted more than data from the sensors, because SSIE data was already filtered and only the lower limit is sent. Therefore, a low pass filtering of the data with a high alpha should be sufficient. A station may have to determine whether to have a received SSIE resent or to drop it. The probability of dropping the SSIE should be disproportional to the maximum direct link strength to the mentioned stations in the SSIE, as the information becomes irrelevant for mesh points that are even farther away.

Embodiments of this invention allow for and provide for a distributed learning method in wireless networks. The distributed learning method includes that, for each new potential simultaneous transmission, detecting other devices in the network by reading beacon frames or frame headers or recipients of an aggregate; detecting of other devices' signal strengths and/or transmission power by means of overhearing/receiving neighboring transmissions to thereby allow for a creation of a neighborhood map to enhance interference awareness and spatial channel reuse; creating a complete graph G=(V, E) having every detected device as a node of the graph; calculating a weighted value of an edge between two nodes w(X,Y) using timing information from the MAC layer (i.e. in the beacon access period and by estimating the signal strength); calculating the interference Carrier over Interference ratio (CoI) by dividing a weighted value of a link that represents the simultaneous transmission by the interference that is produced by the potential transmitter; calculating the receiver CoI as the quotient of a weighted value between the potential transmitter and the intended receiver (w(Tx,Rx)) and the interference of the simultaneous transmission; computing the CoI for every possible simultaneous transmission; deciding whether to transmit or not based on a threshold value ('good'

TxOPs have high interference CoI and high receiver CoI values), and deciding whether to transmit or not based on sophisticated algorithms and procedures that make use of channel and reception information of past transmissions. Embodiments of the invention further may include estimating a weighted value of a link by a running exponential weighted average or by using any filtering technique, including using a Kalman filter. Furthermore, a decision may be made based upon a soft threshold function like the sigmod function, storing, updating and processing measurement information of neighboring stations transmissions to adaptively learn about channel conditions and to identify sufficient periods to successfully transmit packets, and a combination of signal strength information to form a model of the surrounding neighborhood.

Many variations and embodiments of the above-described invention and method are possible. Although only certain embodiments of the invention and method have been illustrated in the accompanying drawings and described in the foregoing Detailed Description, it will be understood that the invention is not limited to the embodiments disclosed, but is capable of additional rearrangements, modifications and substitutions without departing from the invention as set forth and defined by the following claims. Accordingly, it should be understood that the scope of the present invention encompasses all such arrangements and is solely limited by the claims as follows.

What is claimed is:

1. A wireless network comprising:
   a plurality of mesh points participating in the wireless network, wherein one of said plurality of mesh points uses a second one of said plurality of mesh points to communicate with a third one of said plurality of mesh points, said first and third mesh points being out of each other's wireless communication range,
   wherein said one of said plurality of mesh points calculates a first ratio that estimates a probability of a successful transmission of a potential transmission between itself and at least another one of said plurality of mesh points, said first ratio representing a potential interference caused by said potential transmission being simultaneous on a same channel used by a transmission from one of said mesh points;
   determining whether said first ratio is greater than a threshold value; and
   initiating transmission from said first node to said third node through said second mesh point, based on said first ratio being greater than said threshold value.

2. The wireless network of claim 1, wherein said first ratio is a Carrier over Interference ratio (CoI).

3. The wireless network of claim 1, wherein said wireless network is a mesh network.

4. The wireless network of claim 1, wherein said one of said plurality of mesh points creates a world model that includes at least some of the other ones of said plurality of mesh points participating in the wireless network and the calculated ratio for each of the at least some of the other ones of said plurality of mesh points participating in the wireless network.

5. The wireless network of claim 1, wherein said one of said plurality of mesh points calculates a second ratio that estimates a probability of a successful transmission between itself and at least another one of said plurality of mesh points without disturbing a simultaneous transmission in said wireless network with interference from said successful transmission, said first ratio being a receiver carrier over interference ratio and said second ratio being an interference carrier over interference ratio.

6. In a wireless network having a plurality of mesh points, a method of determining whether a first mesh point can transmit to a third mesh point while another mesh point is transmitting on a same channel simultaneously wherein said first mesh point uses a second mesh point to communicate with the third mesh point, said first and third mesh points being out of each other's wireless communication range, said method comprising:
   detecting, by said first mesh point other mesh points in said wireless network;
   determining, at said first mesh point, signal strengths of the detected other mesh points in said wireless network;
   estimating, by said first mesh point, a signal strength that would be measured at said third mesh point if said first mesh point is transmitting simultaneously on a same channel;
   calculating a first carrier over interference (CoI) ratio; and
   transmitting to said third mesh point, through said second mesh point, when said first CoI is greater than a threshold value.

7. The method of claim 6, further comprising:
   calculating a second carrier over interference (CoI) ratio, wherein said first CoI ratio is an interference CoI ratio and said second CoI ratio is a receiver CoI ratio; and wherein said step of transmitting further comprises:
   said second CoI to a second threshold value: and
   transmitting from said first mesh point to said third mesh point, through said second mesh point. when said second CoI is greater than said second threshold.

8. The method of claim 6, wherein said detecting comprises:
   reading at least one of: beacon frames, beacon headers and being a recipient of an aggregate thereof.

9. The method of claim 6, further comprising:
   measuring signal strengths of the detected other mesh points in said wireless network.

10. The method of claim 6, wherein said estimating comprises:
    using timing information in a beacon access period of the MAC layer to estimate said signal strengths.

11. A mesh point within a wireless network of a plurality of mesh points, said mesh point determining whether said mesh point can transmit to a third mesh point, wherein said mesh point and said third mesh point being out of each other's wireless communication range, said mesh point performing the steps comprising:
    detecting other mesh points in said wireless network;
    determining signal strengths of the detected other mesh points in said wireless network;
    estimating a signal strength that would be measured at said third mesh point if said mesh point is transmitting;
    calculating a first carrier over interference (CoI) ratio said CoI ratio representing an interference caused by said transmission being performed simultaneously on a same channel used by a transmission from one of said mesh points;
    comparing said first CoI to a threshold value; and
    determining whether said mesh point should transmit to said third mesh point, through at least one second mesh point based on said first CoI being greater than said threshold value.

12. The mesh point of claim 11, wherein said mesh point further performs the steps comprising:
    calculating a second carrier over interference (CoI) ratio, wherein said first CoI ratio is an interference CoI ratio and said second CoI ratio is a receiver CoI ratio; and determining whether said first mesh point should transmit to said third mesh point, through said second mesh point, based on said first CoI being greater than said threshold value and said second CoI being greater than a second threshold value.

13. The mesh point of claim 11, wherein said detecting other mesh points by said mesh point comprises:
reading at least one of: beacon frames, beacon headers and being a recipient of an aggregate thereof.

14. The mesh point of claim 11, wherein said determining signal strengths by said mesh point comprises:
measuring signal strengths of the detected other mesh points in said wireless network.

15. The mesh point of claim 11, wherein said estimating signal strengths comprises:
using timing information in a beacon access period of the MAC layer to estimate said signal strengths.

16. A first mesh point for use with a plurality of mesh points participating in a wireless network, wherein the first mesh point uses a second one of said plurality mesh points to communicate with a third one of said plurality of mesh points, said first and third mesh points being out of each other's wireless communication range, the first mesh point comprising:
a calculating unit to calculate a ratio that estimates a probability of a successful transmission between itself and at least another one of said plurality of mesh points, said ratio representing a potential interference caused by said successful transmission being simultaneous on a same channel used by a transmission from one of said mesh points; and
a determining unit to determine whether said first mesh point may transmit to said third one of said plurality of mesh points, through said second one of said plurality of mesh points based on said ratio being greater than a threshold value.

17. A station adapted to operate as a mesh point in a wireless network comprising a plurality of mesh points, the station comprising a module configured for:
calculating a first carrier over interference ratio as a weighted value w(Tx,Rx) between a potential transmitter mesh point and an intended receiver and an interference caused by a simultaneous transmission of another mesh point to said intended receiver on a same channel; and
calculating a second carrier over interference ratio as an estimation of a signal strength that an existing transmission produces at a receiving mesh point divided by an estimation of a signal strength that a transmission from said potential transmitter mesh point will produce at the receiving mesh point,
determining whether the first mesh point should transmit to the second mesh point while the other mesh point is transmitting on the same channel simultaneously, the determination depending on comparing the first carrier over interference ratio and the second carrier over interference ratio with a first threshold value and a second threshold value, respectively.

18. A method of determining whether a first mesh point should transmit to a second mesh point while another mesh point is transmitting on a same channel simultaneously, the method comprising the steps of:
calculating a first carrier over interference ratio that corresponds with an estimation of a signal strength that a potential transmission will produce at the other mesh point divided at by an estimation of a signal strength that an existing transmission produces at the other mesh point;
calculating a second carrier over interference ratio that corresponds with an estimation of a signal strength that the existing transmission produces at a receiving mesh point of a pair of yet other mesh points divided by an estimation of a signal strength that the potential transmission will produce at the receiving mesh point of the pair of yet other mesh points,
determining whether the first mesh point should transmit to the second mesh point while the other mesh point is transmitting on the same channel simultaneously, the determination depending on comparing the first carrier over interference ratio and the second carrier over interference ratio with a first threshold value and a second threshold value, respectively.

19. The method of claim 18, wherein estimations of signal strengths are based on measurements of received signals from other mesh points in the wireless network.

20. The method of claim 19, comprising the steps of:
measuring respective signal strengths in respective beacon slots in a beacon period;
using a beacon period access protocol to associate a measured signal strength with a particular mesh point so as to obtain the estimation of the signal strength for that mesh point.

21. The method of claim 20, comprising the step of:
applying a low pass filtering to respective signal strengths measured in respective beacon periods for a particular mesh point.

* * * * *